United States Patent [19]

Benas

[11] Patent Number: 4,849,755

[45] Date of Patent: Jul. 18, 1989

[54] NIGHT VISION GOGGLE COMPATIBLE ALARM

[75] Inventor: Edward P. Benas, Guilford, Conn.

[73] Assignee: United Technologies Corporation, Hartford, Conn.

[21] Appl. No.: 80,367

[22] Filed: Jul. 30, 1987

[51] Int. Cl.⁴ .............................................. G08B 21/00
[52] U.S. Cl. ................................ 340/946; 73/178 H; 250/213 VT; 350/538; 362/29; 340/963
[58] Field of Search ............ 340/945, 963, 964, 980, 340/946; 73/178 R, 178 H, 178 T; 350/538; 250/213 VT; 244/1 R, 17.11; 362/29, 62; 356/13

[56] References Cited

U.S. PATENT DOCUMENTS

| | | | |
|---|---|---|---|
| 2,887,677 | 5/1959 | Arrasmith | 340/963 |
| 3,539,987 | 11/1970 | Greene | 340/963 |
| 4,000,419 | 12/1976 | Crost et al. | 350/538 |
| 4,535,396 | 8/1985 | Guthrie | 362/29 |
| 4,580,196 | 4/1986 | Task | 362/62 |
| 4,722,028 | 1/1988 | Brannon et al. | 362/29 |
| 4,779,942 | 10/1988 | Verney | 250/213 VT |

Primary Examiner—Donnie L. Crosland
Assistant Examiner—Brent A. Swarthout

[57] ABSTRACT

A visual alarm suitable for use with night vision goggles comprises a red incandescent lamp (105); a blue, green or blue-green electroluminscent panel (130); and control means to sequentially activate the above-mentioned light sources. Brief activation of the red lamp causes momentary partial blooming of the night vision goggles to warn of an emergency condition. Subsequent steady energization of the electroluminescent panel provides a continuous observable alarm which does not interfere with operation of the night vision goggles.

6 Claims, 2 Drawing Sheets

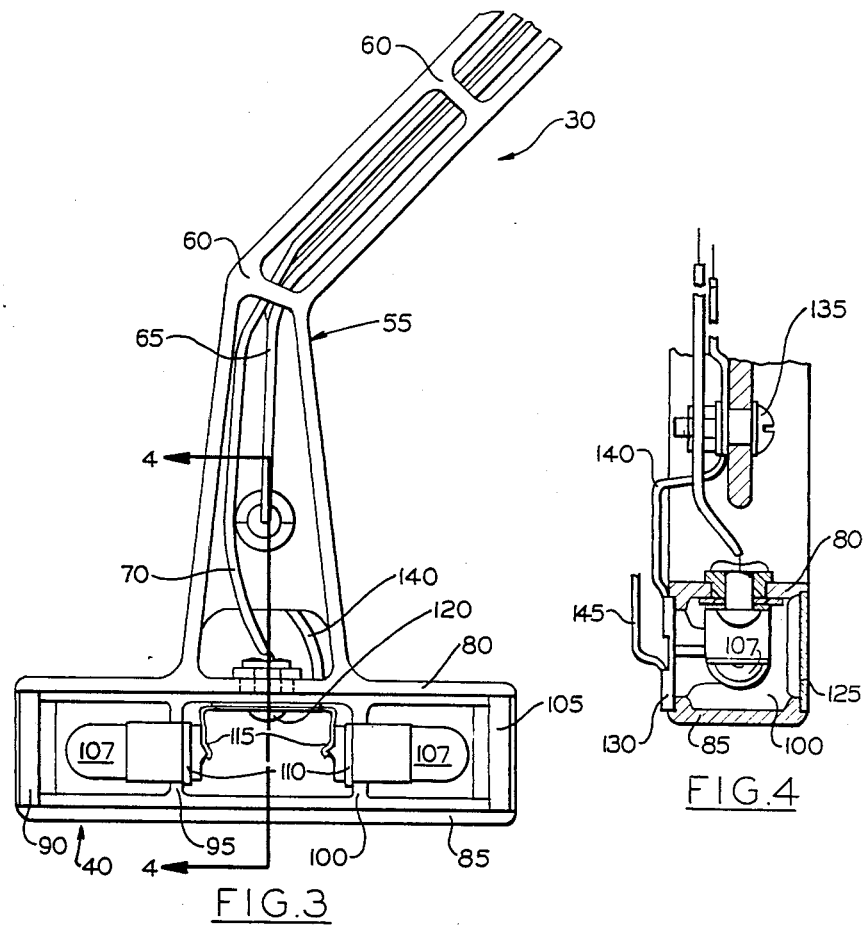
FIG.3
FIG.4
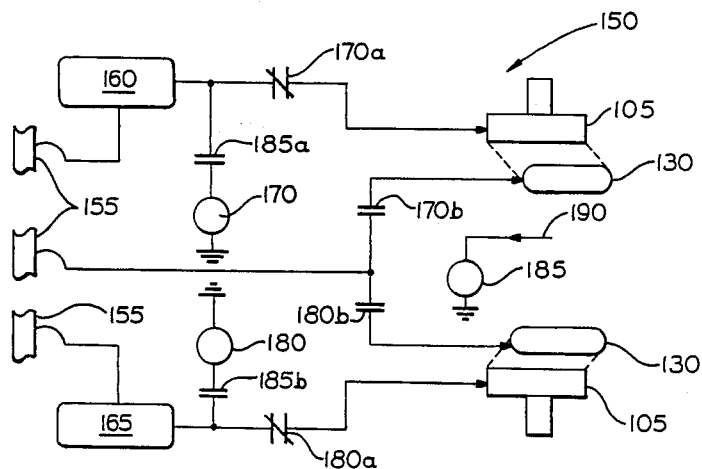
FIG.5

4,849,755

NIGHT VISION GOGGLE COMPATIBLE ALARM

DESCRIPTION

1. Technical Field

This invention pertains to visual alarms suitable for use in conjunction with night vision goggles.

2. Background Art

Night vision goggles (NVGs) are electrobinocular devices which enable one to distinguish visual images at night at illumination levels as low as those associated with starlight. Night vision goggles function by detecting electromagnetic radiation at levels too low to be detected by to the human eye, converting such radiation into electrical signals, and subsequently converting the electrical signals to visible light, amplifying the intensity of the radiation by a factor of 10,000 to 20,000 at maximum sensitivity.

It is well known that the unaided human eye is capable of detecting light energy in the wavelength range of 360 to 760 nanometers (nm) while the spectral sensitivity of night vision goggles is limited to 600 nm to 950 nm. Accordingly, cockpit lighting in aircraft and land vehicles which are operated with the aid of night vision goggles is usually of a blue or green color (a wavelength of 360 nm to 600 nm) so as not to interfere with the operation of night vision goggles used for visual observation exteriorly of the vehicle. (Yellow light has also been found to be a suitable cockpit lighting color for use with night vision goggles.) However, much of the wavelength range associated with red light (above 600 nm) lies within the range of spectral sensitivity of night vision goggles. Interception of such red light by the night vision goggles causes the gain of the goggles to drop drastically thereby blinding a user thereof to images exteriorly of the vehicle, a condition known as goggle "blooming". Thus, red light has been found to be unsuitable for use in cockpits occupied by a user of night vision goggles. However, since red has by custom been used in visual alarms, it has been the practice to provide visual alarms with red warning lights to attract the operators attention during daylight operation. Since such visible red alarm lights are inappropriate for nighttime operation of the vehicle with night vision goggles, an alarm which is suitable for use in both daylight and nighttime operation with night vision goggles is highly desirable.

SUMMARY OF THE INVENTION

In accordance with the present invention, a visual alarm is provided with a first source of red light as well as a second source of blue, green, or blue-green light which does not interfere with operation of night vision goggles; and a means for controlling the two light sources such that at night, the alarm displays a short flash of red light to cause a momentary partial blooming of the night vision goggles, thereby alerting an operator to an emergency condition. The red light is extinguished after a second or so and replaced with the second light source which is easily detected with the unaided eye, yet which does not interfere with further operation of the night vision goggles. In the preferred embodiment, the red light source comprises a red incandescent bulb and the second light source comprises an electroluminescent panel located behind the red incandescent light. The control means may comprise time delay relays which allow the momentary energization of the red light to be replaced with a steady energization of the second light source. The incandescent and electroluminescent lights are conveniently mountable in a control handle on an aircraft such as a control handle used to activate fire extinguishing systems in modern rotary or fixed wing aircraft.

BRIEF DESCRIPTION OF DRAWINGS

FIG. 3 is a plan view of a control handle shown in FIG. 2 incorporating the alarm of the present invention;

FIG. 4 is a sectional view taken in the direction of line 44 of FIG. 3; and

FIG. 5 is a schematic representation of the alarm system of the present invention.

BEST MODE FOR CARRYING OUT THE INVENTION

Figure 1:
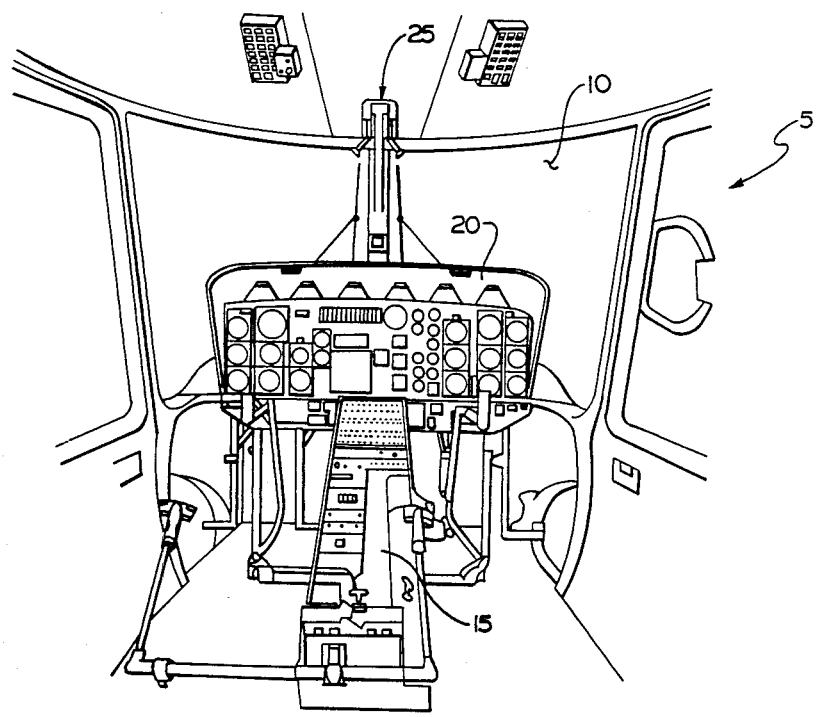
FIG. 1 is a perspective view, facing forward, of the cockpit of a modern helicopter.
Figure 2:
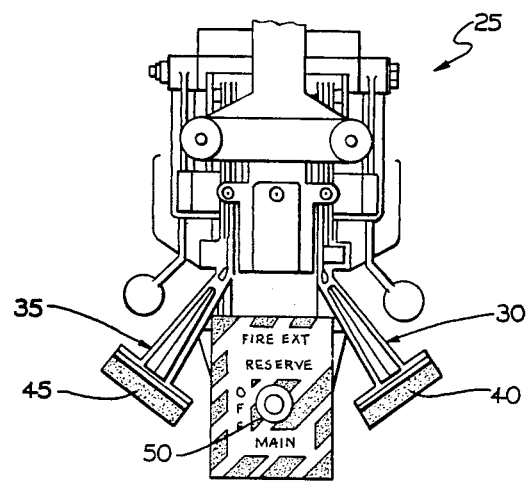
FIG. 2 is an enlarged portion of an upper control panel shown in FIG. 1.

Referring to FIG. 1, a cockpit 5 of a modern twin engine helicopter includes wind screen 10, control console 15, main control panel 20 and upper control panel 25 mounted on the cockpit roof just aft of the wind screen. As best seen in FIG. 2, control panel 25 includes a pair of control handles (T-handles) 30 and 35, including grip portions 40 and 45. Each grip is provided with a visible alarm which warns the helicopter pilot of a fire in one of the two engines. In the event of such an occurrence, the pilot moves the T-handle aft, thereby simultaneously shutting off fuel to the corresponding engine, moving the power lever of the corresponding engine to an OFF position, deenergizing the engine's DC starter-generator, and arming a fire extinguishing system in the engine compartment. Actuation of switch 50 energizes the armed fire extinguisher to put out the fire in the engine.

Referring to FIGS. 3 and 4, the T-handles 30 and 35 each comprise an elongate bent arm 55 of an "I" cross section with spaced reforcing ribs 60 therein which also define an open channel for accommodation of electrical leads 65 and 70. Arm 55 terminates in grip 40 which houses the visual alarm of the present invention. As illustrated, grip 40 includes upper and lower parallel walls 80 and 85 separated by four spaced ribs (stiffeners) 90, 95, 100 and 105. As illustrated in FIG. 3, ribs 95 and 100 are notched to receive red incandescent bulbs 105 therein. Each of the bulbs includes a shoulder portion 110 at the base thereof which is urged against a corresponding rib by a spring connector 115 attached to upper wall 80 by fastener (rivet) 120 which also provides an electrical connection between the spring connectors and power lead 70.

As best seen in FIG. 4, upper and lower walls 80 and 85 are each chamfered along forward and aft surfaces thereof, the chamfers receiving clear lens 125 and electrolumienscent panel 130 electrically connected to groud lead 65 via screw terminal 135 and wire 140 and to a source of electric power by lead 145. The panel and lens may be fixed to the grip by adhesive, fasteners or other known methods.

As set forth hereinabove, because of goggle blooming, while the red light (of wavelength above 525 nm) emitted by incandescent lamps 105 may be suitable for daytime operation of the engine fire alarm, it is, by itself, unsuitable for night flying wherein a pilot is observing the sky and terrain through night vision goggles. However, since the night vision goggles are generally not sensitive to the blue or green light (of wavelength below 525 nm) emitted by electroluminscent panel 130, and since the handles are outside the field of view of the pilot while wearing the goggles, activation of that panel would fail to attract the attention of the pilot. The alarm of the present invention takes advantage of the tendency of the night vision goggles to bloom when intercepting a red light to signal a pilot of the emergency condition. However, the red light is only activated for a brief period of time whereby the night vision goggles bloom only incompletely and temporarily so as not to significantly affect the vision of the wearer. After the brief activation of the red light source, the electroluminescent light source is activated so that when the pilot senses through the night vision goggles (by momentary partial blooming thereof) that an emergency condition exists, he may view the lit electroluminescent panel without the night vision goggles to determine the exact nature of the emergency condition.

A suitable control means for sequentially activating the incandescent bulbs and electroluminescent panel in such manner is shown in FIG. 5 at 150 being connected to fire detection systems 160 and 165—one such system for each engine. The control means comprises essentially three relays: delay on pull in (DOPI) relays 170 and 180 and night vision select relay 185. Relay 170 operates contacts 170a, 170b, relay 180 operates contacts 180a and 180b and relay 185 operates contacts 185a and 185b. Under normal daylight operating conditions, contacts 170a and 180a remain closed, whereby sensing of a fire by detection systems 160 and/or 165 passes current from bus 155 to incandescent bulbs 105 warning the pilot of the fire. For night vision operation, a night vision select signal is applied to relay 185 through line 190, which closes contacts 185a and 185b thereby connecting relays 170 and 180 to the fire detection systems. In the event of detection of a fire by one or both of the detection systems, current is passed immediately to the red incandescent lamps through contacts 170a and 180a which are normally closed, and to relays 170 and 180 through contacts 185a and 185b which are closed in a night vision mode of operation. After a time delay of a second or so, relays 170 and 180 will open contacts 170a and 180a thereby disconnecting the red lamps from the buses and fire detection systems to extinguish the lamps while simultaneously closing contacts 170b and 180b to connect the electroluminescent panels to the bus for actuation thereof simultaneously with the extinguishment of the red lamps.

Accordingly, it will become apparent that the alarm of the present invention is effective in both daylight and nighttime operation with night vision goggles. While red light is normally considered unsuitable for use with night vision goggles, the alarm of the present invention takes advantage of the goggle's characteristic blooming when intercepting red light to provide a brief visual indication of an emergency situation without any substantial disruption in the pilot's vision. Thereafter, the electroluminescent panel provides effective indication of the emergency conditions when viewed without the goggles.

While the alarm of the present invention has been shown within an aircraft cockpit, it will be apparent that it is useful in any other environment wherein night vision goggles are employed. While specific components have been illustrated and described, it will be understood that the invention is not so limited. Thus, while specific types of light sources, i.e., red incandescent lamps and blue, green or blue-green electroluminescent panels have been illustrated, any equivalent light sources having the desired effect or lack thereof on the night vision goggles may be employed. Similarly, while relays have been shown as the means for sequentially activating the two light sources, various other equivalent solid-state switching devices or other suitable control means may be employed. Therefore, it will be understood that the following claims shall cover these and any other equivalent alternatives as fall within the scope of the invention herein.

Having thus described the invention, what is claimed is:

1. A visual alarm compatible with the use of night vision goggles in a vehicle, said alarm being characterized by:
    a first light source which, is activated in response to the detection of an emergency condition by detecting means and causes at least temporary blooming of said night vision goggles;
    a second light source which is visible without night vision goggles and does not cause blooming when viewed through night vision goggles for rendering said alarm visible at night with an unaided eye; and
    control means for briefly actuating said first light source and subsequently extinguishing said first light source and activating said second light source in response to a detected emergency condition.

2. The visual alarm of claim 1 characterized by said first light source comprising a light having a wave length generally greater than 525 nm.

3. The visual alarm of claim 1 characterized by said second light source comprising an electroluminescent panel which emits light having a wave length generally less than 525 nm.

4. The visual alarm of claim 1 characterized by said second light source being disposed behind said first light source and, when energized, being visible around said first light source when unenergized, by an observer in front thereof.

5. The visual alarm of claim 1 characterized by said first and second light sources being visibly disposed in a control handle for activating an aircraft fire control system.

6. The alarm of claim 1 characterized by said control means comprising a time delay relay activated in response to detection of said emergency condition, said time delay relay having first and second contacts connected to said first and second light sources respectively for connecting a source of electric current to said first light source immediately upon detection of said alarm condition, and said second light source thereafter while simultaneously disconnecting said first light source from said source of electric current.

* * * * *